(12) United States Patent
Yang et al.

(10) Patent No.: US 10,896,519 B2
(45) Date of Patent: Jan. 19, 2021

(54) SYSTEMS AND METHODS FOR STEREOSCOPIC IMAGING

(71) Applicant: SZ DJI TECHNOLOGY CO., LTD., Shenzhen (CN)

(72) Inventors: Kang Yang, Shenzhen (CN); Mingming Gao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/240,704

(22) Filed: Jan. 4, 2019

(65) Prior Publication Data

US 2019/0180461 A1  Jun. 13, 2019

Related U.S. Application Data

(63) Continuation of application No. PCT/CN2016/088829, filed on Jul. 6, 2016.

(51) Int. Cl.
| | | |
|---|---|---|
| G06T 7/593 | (2017.01) | |
| H04N 13/128 | (2018.01) | |
| H04N 13/239 | (2018.01) | |
| G06K 9/62 | (2006.01) | |
| H04N 13/00 | (2018.01) | |

(52) U.S. Cl.
CPC ............ *G06T 7/593* (2017.01); *G06K 9/6202* (2013.01); *H04N 13/128* (2018.05); *H04N 13/239* (2018.05); *G06K 2009/6213* (2013.01); *G06T 2207/10012* (2013.01); *G06T 2207/20021* (2013.01); *H04N 2013/0081* (2013.01)

(58) Field of Classification Search
CPC ........... G06T 7/593; G06T 2207/20021; G06T 2207/10012; G06K 9/6202; G06K 2009/6213; H04N 13/239; H04N 2013/0081; H04N 13/128
USPC .......................................................... 348/47
See application file for complete search history.

(56) References Cited

U.S. PATENT DOCUMENTS

| | | | |
|---|---|---|---|
| 8,009,897 B2 | 8/2011 | Xu et al. | |
| 9,721,348 B2* | 8/2017 | Jeong | .......................... G06T 7/44 |
| 2009/0263009 A1* | 10/2009 | Krishnaswamy | .... G05D 1/0253 |
| | | | 382/154 |
| 2010/0142824 A1* | 6/2010 | Lu | ............................. G06K 9/32 |
| | | | 382/195 |
| 2013/0121559 A1* | 5/2013 | Hu | ........................... G06T 7/593 |
| | | | 382/154 |
| 2013/0170736 A1* | 7/2013 | Guo | ......................... G06T 7/593 |
| | | | 382/154 |

(Continued)

FOREIGN PATENT DOCUMENTS

| | | |
|---|---|---|
| CN | 101321299 A | 12/2008 |
| CN | 101498889 A | 8/2009 |

(Continued)

OTHER PUBLICATIONS

The World Intellectual Property Organization (WIPO) The International Search Report and Written Opinion for PCT/CN2016/088829 dated Mar. 29, 2017 8 Pages.

*Primary Examiner* — Tung T Vo
(74) *Attorney, Agent, or Firm* — Anova Law Group, PLLC

(57) ABSTRACT

A method of block matching includes selecting a block configuration from a plurality of block configurations and matching a first point in a first image with a corresponding second point in a second image using the selected block configuration.

17 Claims, 18 Drawing Sheets

(56) References Cited

U.S. PATENT DOCUMENTS

| | | | |
|---|---|---|---|
| 2013/0177237 A1* | 7/2013 | Schamp | G06K 9/00805 |
| | | | 382/154 |
| 2013/0229485 A1* | 9/2013 | Rusanovskyy | H04N 19/52 |
| | | | 348/43 |
| 2013/0259360 A1* | 10/2013 | Bingrong | G06T 7/593 |
| | | | 382/154 |
| 2014/0009462 A1* | 1/2014 | McNamer | H04N 13/239 |
| | | | 345/419 |
| 2015/0036916 A1* | 2/2015 | Mundhenk | G06T 7/593 |
| | | | 382/154 |
| 2015/0063680 A1* | 3/2015 | Liu | H04N 13/128 |
| | | | 382/154 |
| 2015/0131853 A1* | 5/2015 | Lim | G06K 9/00355 |
| | | | 382/103 |
| 2015/0248594 A1* | 9/2015 | Zhong | B60R 11/04 |
| | | | 382/195 |
| 2015/0248769 A1 | 9/2015 | Ukil et al. | |
| 2015/0269737 A1* | 9/2015 | Lam | H04N 13/111 |
| | | | 382/154 |
| 2015/0279045 A1* | 10/2015 | Zhong | G06T 7/593 |
| | | | 382/154 |
| 2015/0296202 A1* | 10/2015 | Zhong | H04N 13/296 |
| | | | 348/47 |
| 2015/0377607 A1* | 12/2015 | Einecke | G06T 7/564 |
| | | | 382/104 |
| 2016/0301912 A1* | 10/2016 | Saitoh | G06K 9/46 |
| 2017/0116739 A1* | 4/2017 | Jeong | G06T 7/593 |
| 2018/0027224 A1* | 1/2018 | Javidnia | H04N 13/271 |
| | | | 382/154 |
| 2019/0020861 A1* | 1/2019 | Leonard | G06T 7/593 |

FOREIGN PATENT DOCUMENTS

| | | |
|---|---|---|
| CN | 102065313 A | 5/2011 |
| CN | 103260043 A | 8/2013 |
| CN | 103337064 A | 10/2013 |
| CN | 103822616 A | 5/2014 |
| CN | 104284172 A | 1/2015 |
| CN | 104639933 A | 5/2015 |

* cited by examiner

SYSTEMS AND METHODS FOR STEREOSCOPIC IMAGING

CROSS-REFERENCE TO RELATED APPLICATION

This application is a continuation of International Application No. PCT/CN2016/088829, filed on Jul. 6, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to computer vision and more particularly, but not exclusively, to systems and methods for stereoscopic imaging.

BACKGROUND

High-precision depth mapping is important for applications such as automatic obstacle avoidance in robotics and mobile platforms, geographic mapping, and space exploration. Stereoscopic imaging is a technique for providing depth information using binocular vision. Such a technique can be used for constructing a depth map from two or more images by matching features in the images. Existing techniques for matching features, however, often have mismatching problems, especially when encountering complex images with significant depth variation or smooth texture.

In view of the foregoing, there is a need for systems and methods for stereoscopic imaging that overcome the disadvantages of currently systems and methods.

SUMMARY

In accordance with a first aspect disclosed herein, there is set forth a method of block matching between a first image and a second image for stereoscopic imaging, comprising: selecting a block configuration from a plurality of block configurations; and matching a first point on the first image with a corresponding second point on the second image using the selected block configuration.

In accordance with another aspect disclosed herein, there is set forth a stereoscopic imaging system, comprising: a first imaging device configured to obtain a first image; a second imaging device configured to obtain a second image; and one or more processors configured to: select a block configuration from a plurality of block configurations; and match a first point on the first image with a corresponding second point on the second image using the selected block configuration.

In accordance with another aspect disclosed herein, there is set forth an apparatus for stereoscopic imaging, comprising one or more processors configured to: receive a first image; receive a second image; select a block configuration from a plurality of block configurations; and match a first point on the first image with a corresponding second point on the second image using the selected block configuration.

In accordance with another aspect disclosed herein, there is set forth a computer readable storage medium, comprising: instruction for selecting a block configuration from a plurality of block configurations for stereoscopic imaging; and instruction for matching a first point on the first image with a corresponding second point on the second image using the selected block configuration.

In accordance with another aspect disclosed herein, there is set forth a processing system, comprising: a receiving module for receiving a first image obtained by an first imaging device and a second image obtained by a second imaging device; a selecting module for selecting a block configuration from a plurality of block configurations for stereoscopic imaging; and a matching module for matching a first point on the first image with a corresponding second point on the second image using the selected block configuration.

Figure 1:
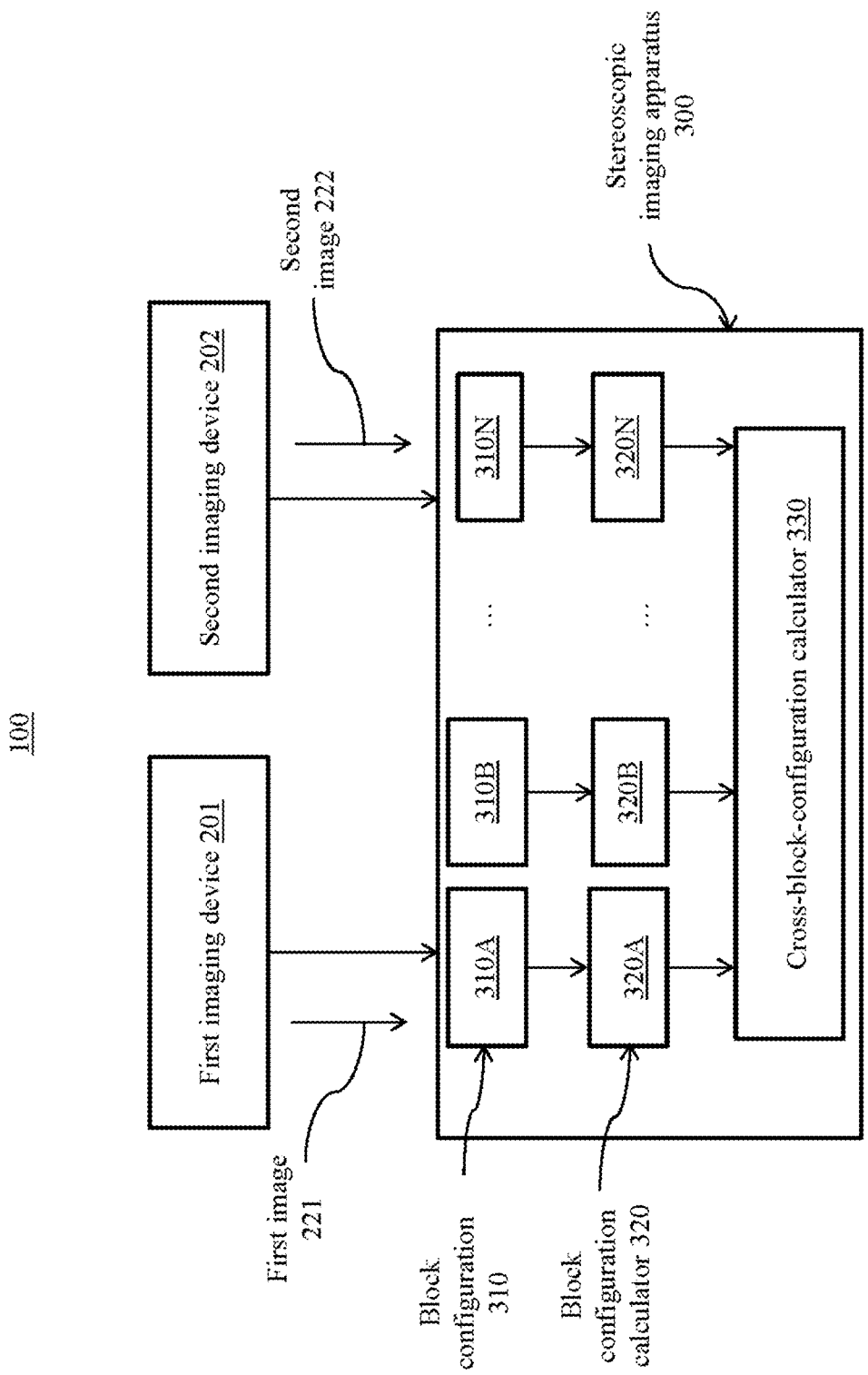
FIG. 1 is an exemplary diagram illustrating an embodiment of a system for stereoscopic imaging.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Current systems and methods have drawbacks in ensuring high accuracy block matching between two images for stereoscopic imaging. The present systems and methods improve accuracy in block matching by using blocks of varying shapes and sizes, as described in further specificity below.

The present systems and methods are illustrated with respect to an exemplary stereoscopic imaging system 100 in FIG. 1. The stereoscopic imaging system 100 can include a first imaging device 201 and a second imaging device 202 for capturing a first image 221 and a second image 222, respectively. Although the stereoscopic imaging system 100 is shown to include two imaging devices 201, 202 for illustrative purposes only, the present systems and methods can use any number of imaging devices (for example, one, two, three, four, five, six, or more imaging devices) for stereoscopic imaging, as desired. For example, two or more pairs of imaging devices can be used for enhanced stereoscopic imaging, as desired. The imaging devices 201, 202 can receive incident light from an external environment and convert the incident light into digital and/or analog signals (not shown). The signals can be processed to produce the images 221, 222 that can be displayed to a user. Exemplary imaging devices 201, 202 suitable for use with the present systems and methods include, but are not limited to, commercially-available cameras and camcorders.

The imaging devices 201, 202 can be relatively positioned in a selected manner, so the images 221, 222 can perceive an object (shown in FIG. 2) from different perspectives. The imaging devices 201, 202 can be positioned in any desired manner in the stereoscopic imaging system 100. In some embodiments, for example, the imaging devices 201, 202 can be positioned side-by-side so that the imaging devices 201, 202 have parallel optical axes.

The stereoscopic imaging system 100 can include a stereoscopic imaging apparatus 300 for receiving the images 221, 222 from the imaging devices 201, 202, respectively. The stereoscopic imaging apparatus 300 can obtain depth information of the object based on the images 221, 222. Exemplary depth information can include an object distance from the object to the first imaging device 201 and/or the second imaging device 202.

The stereoscopic imaging apparatus 300 can obtain the depth information by matching the first image 221 with the second image 222 using block matching. As shown in FIG. 1, the stereoscopic imaging apparatus 300 can select a plurality of block configurations 310 for block matching. Each block configuration 310 can include one or more configuration parameters for defining one or more blocks 341, 342 (shown in FIG. 2) on each of the first image 221 and the second image 222, respectively. Exemplary configuration parameters can include size (expressed by number of pixels, for example), shape, or a combination thereof.

As shown in FIG. 1, a block configuration calculator 320 can be implemented based on a corresponding block configuration 310. That is, the block configuration calculators 320A, 320B, . . . , 320N can be implemented based on block configurations 310A, 320B, . . . , 310N, respectively. The block configuration calculator 320 can perform any calculation and/or operations used for evaluating matching between the blocks 341, 342. For example, evaluating matching can include calculating a matching cost c. The matching cost c can quantify a similarity between pixels in the blocks 341, 342. Any suitable comparison method between pixels of two blocks can be used to find the matching cost c. Exemplary methods for finding the matching cost c include comparison of pixel values using correlation, covariance, sum of absolute difference, sum of squared differences, and the like.

In some embodiments, results generated by the block configuration calculators 320 can be inputted to a cross-block-configuration calculator 330 to compare and contrast matching results using different block configurations 310.

Figure 2:
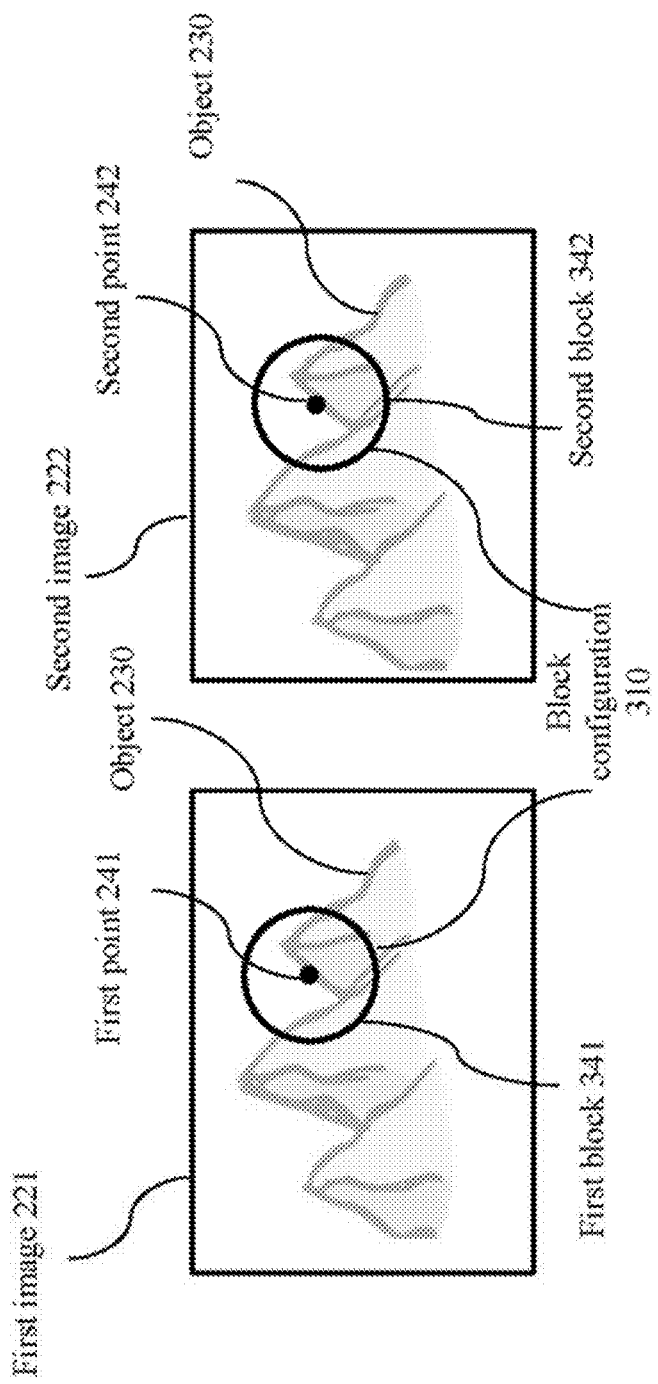
FIG. 2 is an exemplary diagram illustrating an embodiment of block matching using the system of FIG. 1.

Turning now to FIG. 2, exemplary first and second images 221, 222 of an object 230 are shown for block matching using an exemplary block configuration 310 that is circular. Based on the block configuration 310, a first block 341 that includes a first point 241 is defined on the first image 221. Similarly, a second block 342 that includes the second point 242 can be defined. Each point 241, 242 can include one or more adjacent pixels representing a part of the image. In some embodiments, each point can be a single pixel. In some embodiments, each point can include a feature (for example, a set of pixels representing an object) represented by a plurality of pixels.

Although FIG. 2 shows the block configuration 310 as having a circular shape for illustrative purposes only, the block configurations 310 can have any uniform and/or different shapes. At least one of the block configurations 310 can have a non-rectangular shape. Exemplary block configurations 310 can have a triangular shape, a circular shape, an oval shape, a trapezoidal shape, a polygonal shape, or any combination thereof. The shapes can be regular or irregular, as desired. Additionally and/or alternatively, the block configurations 310 can have any uniform and/or different sizes. Exemplary dimensions include, for example, 7 pixels, 9 pixels, 13 pixels, 20 pixels, 25 pixels, or more. In one example, the block configuration 310 can have a square shape having a size of 7 pixels by 7 pixels, 9 pixels by 9 pixels, 13 pixels by 13 pixels, or 25 pixels by 25 pixels.

Figure 3:
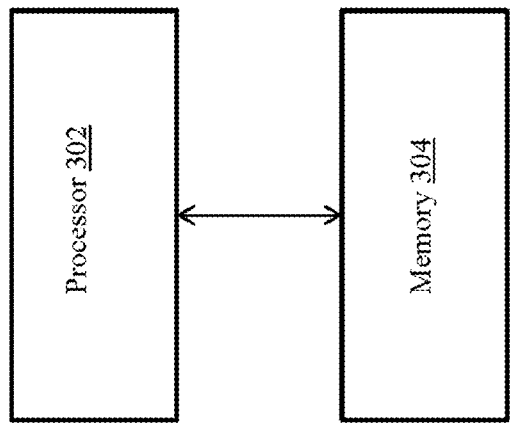
FIG. 3 is an exemplary diagram illustrating an embodiment of a stereoscopic imaging apparatus of the system of FIG. 1.

Turning now to FIG. 3, the exemplary stereoscopic imaging apparatus 300 is shown as including processor 302 and a memory 304. The processor 302 can be any type of processing system for implementing block matching functions and/or other operations described in the present disclosure. Exemplary processors 302 include, without limitation, one or more general purpose microprocessors (for example, single or multi-core processors), application-specific integrated circuits (ASICs), application-specific instruction-set processors, graphics processing units (GPUs), physics processing units, digital signal processing units, coprocessors, network processing units, audio processing units, encryption processing units, and the like.

In certain embodiments, the processor 302 can include specialized hardware and/or software for performing various block matching functions and operations described herein. For example, the processor 302 can include an image processing engine or media processing unit, which can include specialized hardware for enhancing the speed and efficiency of certain operations for image processing and block matching. Specialized hardware can include, but are not limited to, specialized parallel processors, caches, high speed buses, and the like. In some embodiments, the processor 302 can include field-programmable gate arrays (FPGAs), ASICs, central processing units (CPUs), GPUs, visual processing units (VPUs), or a combination thereof.

Although FIG. 3 shows the stereoscopic imaging apparatus 300 as including one processor 302 for illustrative purposes only, the stereoscopic imaging apparatus 300 can include any number of uniform and/or different processors 302.

The memory 304 (alternatively referred to herein as a non-transitory computer readable medium) can comprise any type of memory and can be, for example, a random access memory (RAM), a static RAM, a dynamic RAM, a read-only memory (ROM), a programmable ROM, an erasable programmable ROM, an electrically erasable programmable ROM, a flash memory, a secure digital (SD) card, and the like. In some embodiments, the memory 304 has a storage capacity that accommodates the needs of the block matching functions and operations described herein. The memory 304 can have any commercially-available memory capacity suitable for use in image processing applications and, in some embodiments, has a storage capacity of at least 512 Megabytes, 1 Gigabyte, 2 Gigabytes, 4 Gigabytes, 16 Gigabytes, 32 Gigabytes, 64 Gigabytes, or more. Although FIG. 3 shows the stereoscopic imaging apparatus 300 as including one memory 304 for illustrative purposes only, the stereoscopic imaging apparatus 300 can include any number of uniform and/or different memories 304.

The stereoscopic imaging apparatus 300 can further include any hardware and/or software desired for performing the block matching functions and operations described herein. For example, the stereoscopic imaging apparatus 300 can include one or more input/output interfaces (not shown) for receiving the images 221, 222 shown in FIG. 1. Exemplary interfaces include, but are not limited to, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces. As another example, the stereoscopic imaging apparatus 300 can include one or more input/output devices (not shown), for example, buttons, a keyboard, keypad, trackball, displays, and/or a monitor. As yet another example, the stereoscopic imaging apparatus 300 can include hardware for communication between components of the image processing system 100 (for example, between the processor 302 and the memory 304).

Figure 4:
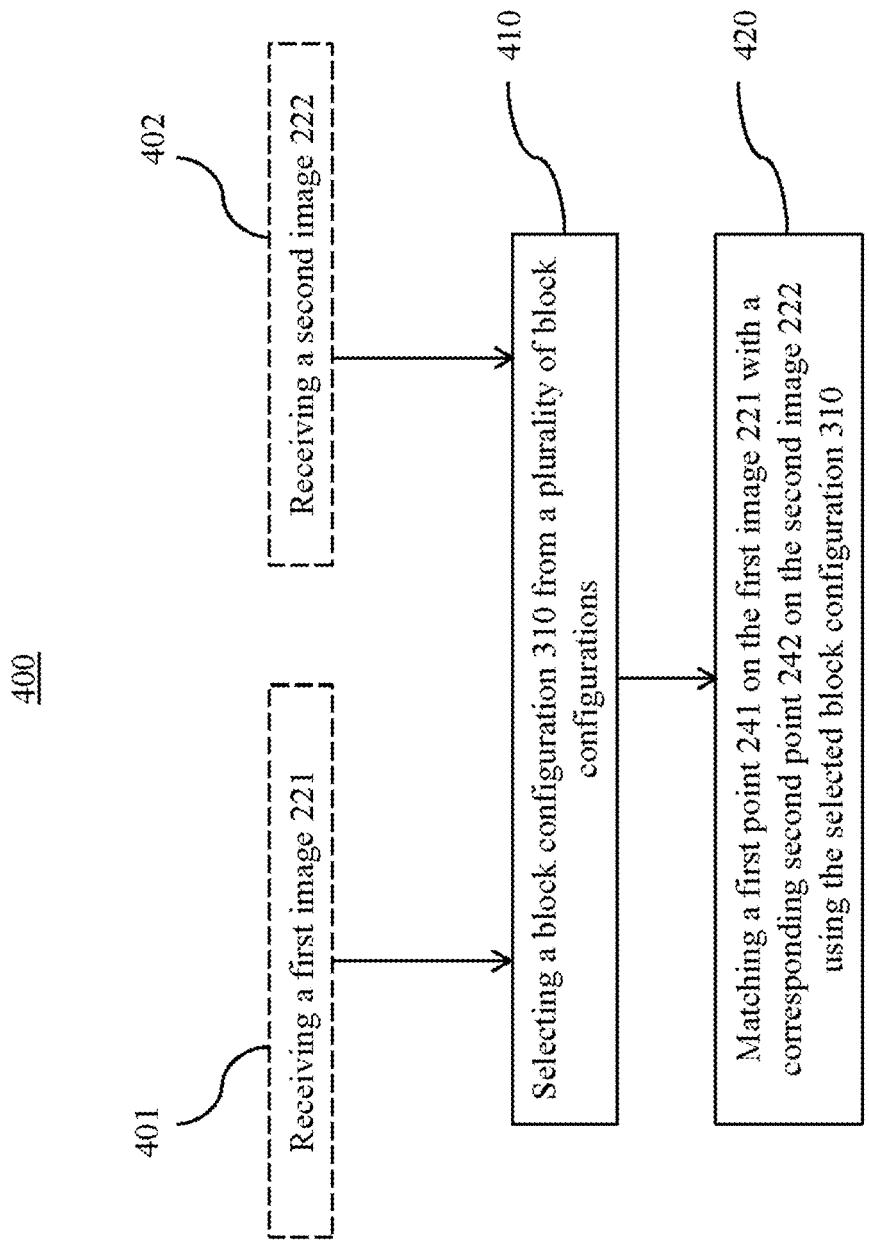
FIG. 4 is an exemplary top-level flow chart illustrating an embodiment of a method for block matching using the system of FIG. 1.

Turning now to FIG. 4, an exemplary method 400 for stereoscopic imaging is shown. Optionally, the first image 221 can be obtained, at 401. Optionally, the second image 221 can be obtained, at 402. In one example, the stereoscopic imaging apparatus 300 can receive the images 221, 222 respectively obtained from the imaging devices 201, 202 shown in FIG. 2. In another example, the stereoscopic imaging apparatus 300 can obtain the images 221, 222 stored on another computer system (not shown), and the stereoscopic imaging apparatus 300 is not necessarily in communication with the imaging devices 201, 202.

At 410, a block configuration 310 is selected from a plurality of block configurations 310. For example, the block configuration 310 can be selected from a library of block configurations 310. The library of block configurations 310 can be predefined by an operator, as desired. In an illustrative and non-limiting example, the block configuration 310 can be selected based on a texture of the object 230 (shown in FIG. 2). In the example, when the object 230 has a smooth texture (such as a monochromatic wall or smooth glass), the block configurations 310 having a small size may provide limited information and result in mismatching. Thus, a block configurations 310 having a large size can be selected to provide more information for block matching. In another example, when the object 230 has a rough texture with significant depth variation, a block configuration 310 having a large size can lead to poor overlapping (or large amount of mismatching features) between the images 221, 222. Such poor overlapping can result in a very low degree of matching. Thus, a block configuration 310 having a small size can be selected. In still another example, a block configuration 310 having a shape and/or size matching shape of the object 230 or a portion of the object 230 can be selected, for the block configuration 310 to include a selected texture for matching.

In one embodiment, the stereoscopic imaging apparatus 300 can select one or more predetermined block configurations 310. For example, an operator can select block configurations 310 with a variety of shapes and/or sizes, with or without consideration of content of the images 221, 222.

In some embodiments, the stereoscopic imaging apparatus 300 can select the block configuration 310 dynamically. For example, block configurations 310 can be selected based on content of the images 221, 222, such as based on the shape and/or size of object 230 in the images 221, 222. For example, the stereoscopic imaging apparatus 300 can perform one or more image feature recognition and/or feature detection methods to determine texture of the object 230 in the images 221, 222. Exemplary feature recognition methods can include edge detection (for example, Shi & Tomasi corner detection), image binarization, SURF blob (Speeded Up Robust Features) detection, MSER blob (Maximally Stable Extremal Regions) detection, SIFT (Scale-Invariant Feature Transform) descriptors, FREAK (Fast REtinA Keypoint) descriptors, BRISK (Binary Robust Invariant Scalable Keypoints) descriptors, HOG (Histogram of Oriented Gradients) descriptors, and the like.

In yet other embodiments, the stereoscopic imaging apparatus 300 can select the block configuration 310 randomly. Randomizing the selection of the block configuration 310 can reduce matching error associated with using a fixed set of block configuration 310 for a specific type of texture, for example.

As shown in FIG. 4, at 420, the first point 241 on the first image 221 is matched with the corresponding second point 242 on the second image 222 using the block configurations 310. Stated somewhat differently, the second point 242 that corresponds to the first point 241 can be identified based on the matching.

The method 400 can advantageously improve accuracy of block matching. As previously described, different size and/or shape of the block configuration 310 can result in different accuracy of block matching. When a single block configuration 310 is used, the block configuration 310 may not be able to adapt to all types of complex scenes or objects. Using a plurality of block configurations 310 can ensure that one or more block configurations 310 can be suitable for achieving accurate matching and reducing probability of mismatching. Using the plurality of block configurations 310 can thus compensate for limitations or inaccuracies associated with single block configuration 310, thereby improving the accuracy and reliability of a block matching result.

Figure 5:
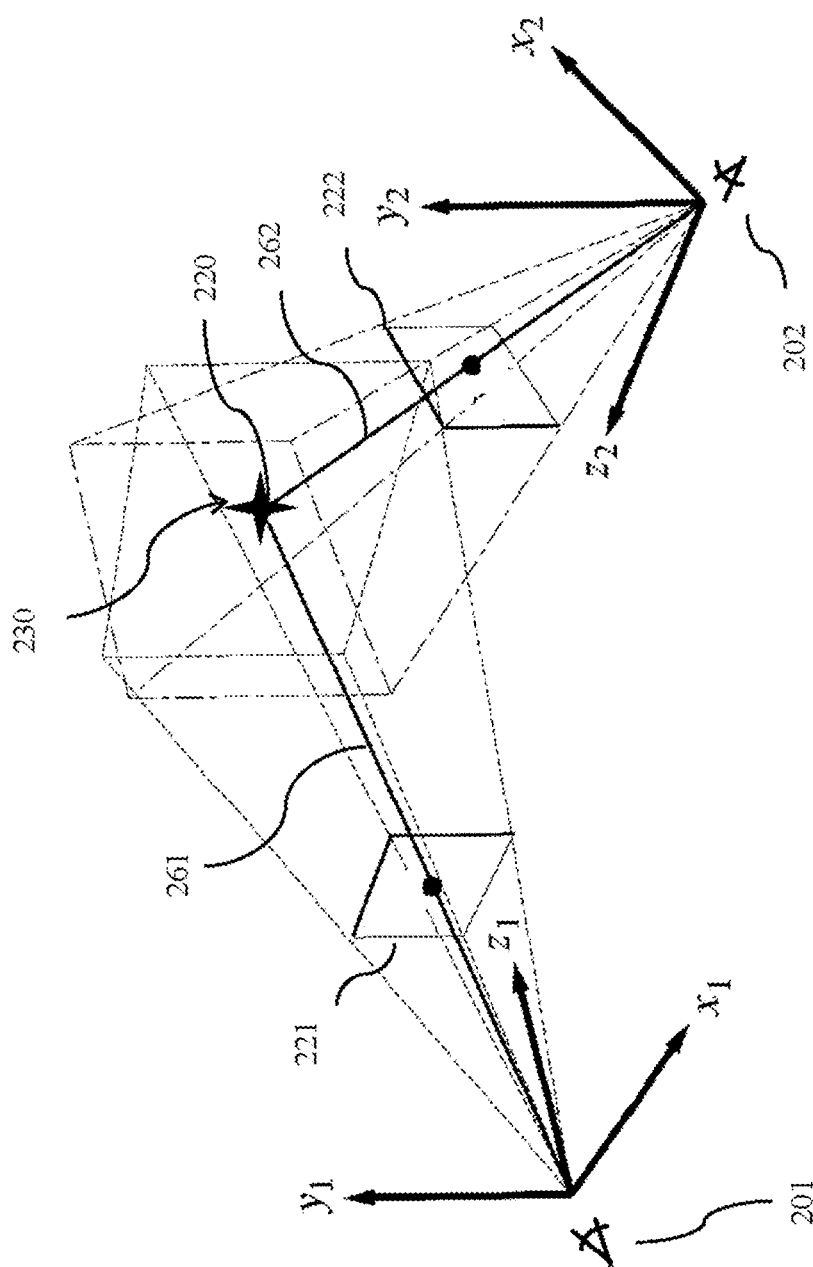
FIG. 5 is an exemplary diagram illustrating an embodiment of a method for triangulation of distance using the system of FIG. 1.
Figure 6:
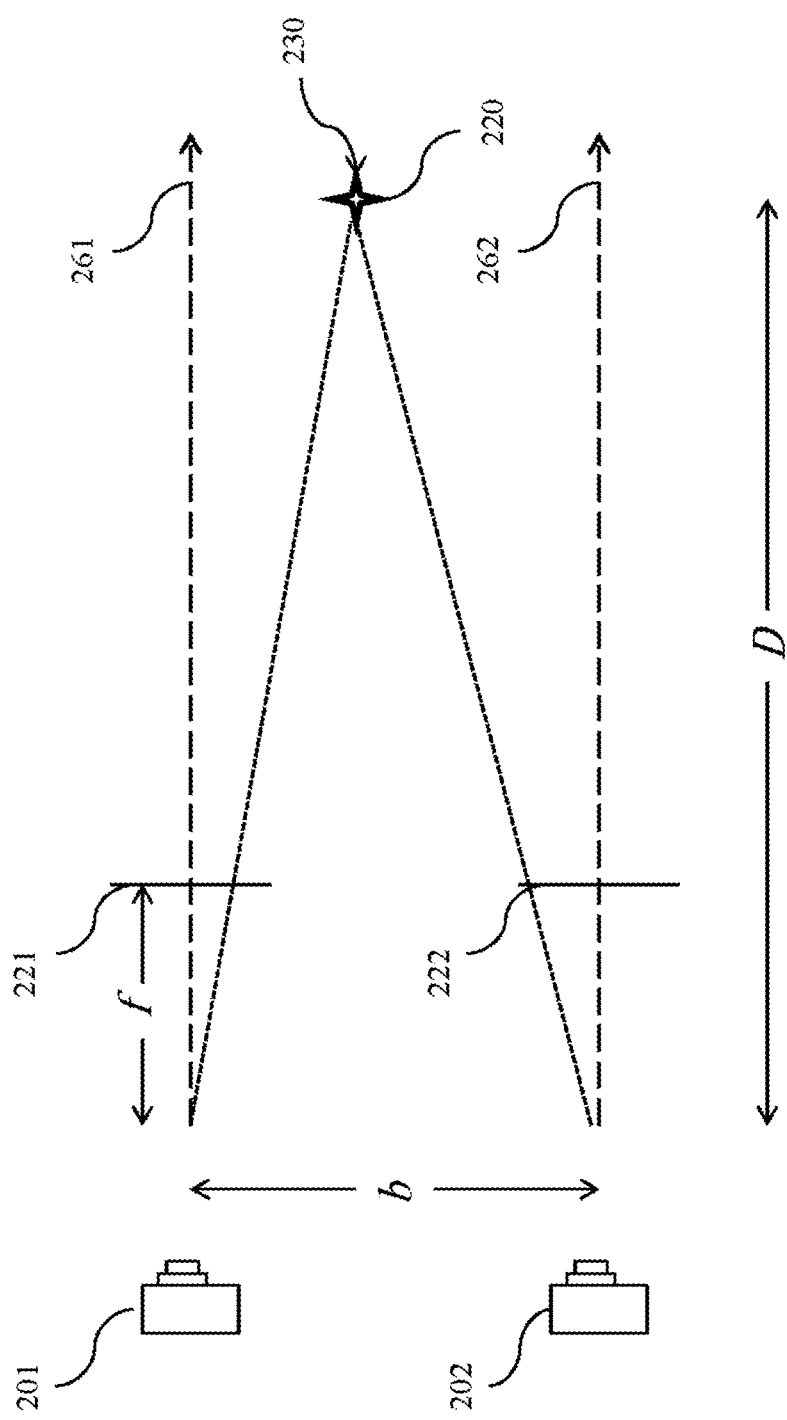
FIG. 6 is an exemplary diagram illustrating another embodiment of a method for triangulation of distance using the system of FIG. 1.

FIG. 5 and FIG. 6 are shown to illustrate obtaining the depth information using the images 221, 222. FIG. 5 shows the imaging devices 201, 202 imaging the object 230 using stereopsis. FIG. 6 illustrates a method of ascertaining an object distance D using triangulation with reference to the two imaging devices 201, 202. Each of the imaging devices 201, 202 perceives a same point 220 on the object 230, but in different spatial coordinates as illustrated by the coordinate axes (x1, y1, z1) and (x2, y2, z2). The imaging devices 201, 202 perceive the point 220 along respective optical axes 261, 262 and thereby arrive at two different images 221, 222 of the point 220. The point 220 is captured in the images 221, 222 as the first and second points 241, 242 (shown in FIG. 2), respectively. The images 221, 222 can be two-dimensional. The images 221, 222 are typically different, being taken from different positions, unless the imaging devices 201, 202 are positioned such that their optical axes 261, 262 coincide. Accordingly, under most circumstances, a disparity d shown in Equation (4) can be found between the images 221, 222, as described below with reference to FIG. 6.

Referring now to FIG. 6, the images 221, 222 can be compared to ascertain the object distance D between the pair of imaging devices 201, 202 and the point 220. A method of triangulation can be used to ascertain the object distance D using the disparity d shown in Equation (4). Specifically, the position of the point 220 having an index i, represented by coordinates ($x_i$, $y_i$, $z_i$), can be given as follows:

$$x_i = \frac{b}{d}(x_i^K - c_x),$$ Equation (1)

$$y_i = \frac{b}{d}(y_i^K - c_y), \text{ and}$$ Equation (2)

$$z_i = \frac{b}{d}f$$ Equation (3)

where $c_x$ and $c_y$ represent respective center coordinates of the first imaging device 201 (or the second imaging device 202), $x_i^K$ and $y_i^K$ represent the coordinates representing the point 220 in the first image 221 where K=1 (or the second image 222 where K=2), b is the baseline (in other words, the distance between the center coordinates of the imaging devices 201, 202), $f$ is the focal length of each of the imaging devices 201, 202 (assuming here that the imaging devices 201, 202 have the same focal length), i is an index over multiple points 220 of the object 230, and d is the disparity between the images 221, 222, represented here as:

$$d_i = x_i^1 - x_i^2.$$ Equation (4)

Based on the images 221, 222 and using Equations (1)-(4), the stereoscopic imaging apparatus 300 shown in FIG. 1 can determine the coordinate $z_i$. The object distance D can be equal to and/or based on the coordinate $z_i$.

Figure 7:
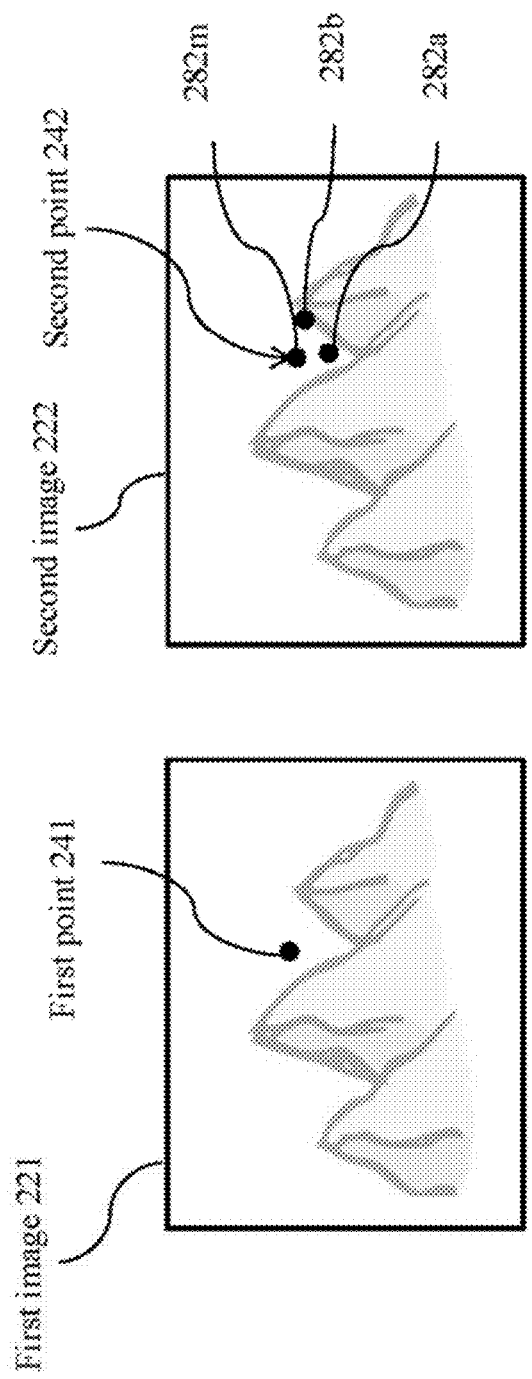
FIG. 7 is an exemplary diagram illustrating an embodiment of block matching using the system of FIG. 1.

Turning to now FIG. 7, another illustrative example of matching points between two images is shown. As shown in FIG. 7, for a given first 241 on the first image 221, a matching process can be used to select a second point 242 on the second image 222 that corresponds to the first point 241. A plurality of candidate second points 282a . . . 282m can be selected for evaluation of a matching cost c for determining the suitability of matching. As described above with reference to FIG. 1, any suitable comparison method between pixels of two blocks can be used to find the matching cost c. Exemplary methods for finding the matching cost c include comparison of pixel values using correlation, covariance, sum of absolute difference, sum of squared differences, and the like. Based on the matching costs c, the second point 242 can be selected from among the candidate second points 282a . . . 282m.

The candidate second points 282a . . . 282m for matching can be selected in any manner. In some embodiments, the candidate second points 282a . . . 282m can be selected in a predefined neighborhood about the coordinates of the first point 241. For example, candidate second points 282a . . . 282m can be evaluated that are within a defined range that is 2 pixels, 4 pixels, 8 pixels, 16 pixels, 32 pixels, 64 pixels, 128 pixels, 256 pixels, or more of the coordinates of the first point 241. Alternatively, all pixels of the second image 222 can be evaluated. In some embodiments, all of the pixels within the defined range can be evaluated for the matching cost c. In other embodiments, pixels within the defined range can be sampled (for example, randomly or by interval sampling) for the matching cost c.

Figure 8:
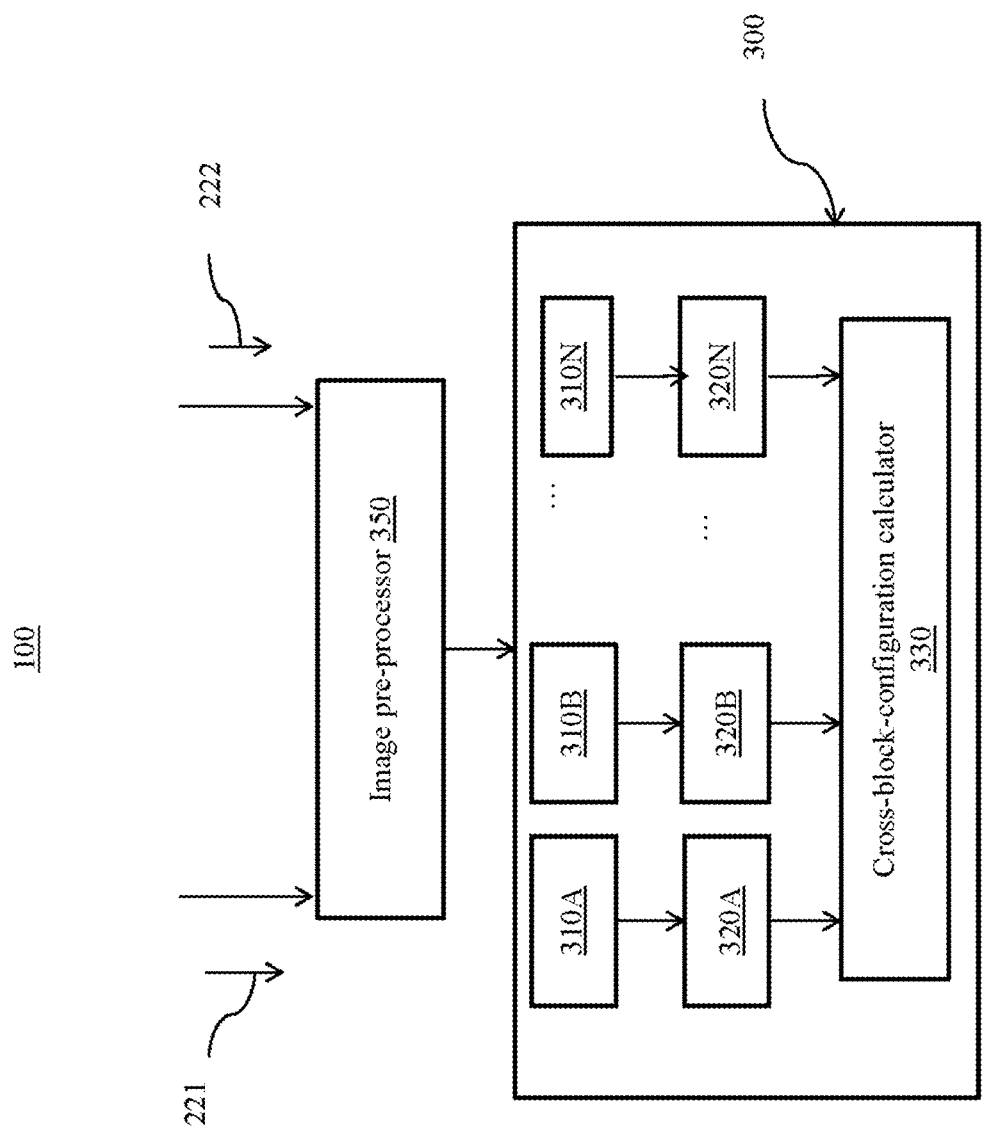
FIG. 8 is an exemplary diagram illustrating an embodiment of the system of FIG. 1, wherein an image pre-processor is shown.

Turning now to FIG. 8, an exemplary stereoscopic imaging system 100 can include an image pre-processor 350 for pre-processing images 221, 222. The image pre-processor 350 can execute any image transformation operations for projecting the images 221, 222 onto a common image plane defined in a common coordinate system (shown in FIG. 9). For example, the image pre-processor 350 can be used for rectifying the images 221, 222. The image pre-processor 350 can transform the images 221, 222 so that the coordinate axes (x1, y1, z1) and (x2, y2, z2) are aligned. For example, the image pre-processor 350 can perform rotation to align the x1-axis with the x2-axis and/or align the y1-axis with the y2-axis. Additionally and/or alternatively, the image pre-processor 350 can perform scaling transformation to eliminate scaling difference between the images 221, 222. Additionally and/or alternatively, the image pre-processor 350 can perform rotation and/or skew adjustments in z direction to align the z1-axis with the z2-axis. By pre-processing the images 221, 222 images, the pre-processor 350 can simplify subsequent block matching between the images 221, 222, advantageously improving matching efficiency.

Additionally and/or alternatively, the image pre-processor 350 can be configured to perform any image processing operations to improve quality of the images 221, 222. Subsequent block matching can advantageously be more easily performed. Exemplary image processing operations include, but are not limited to, image de-noising, image sharpening, and/or image de-blurring.

Although FIG. 8 shows the image pre-processor 350 and the stereoscopic imaging apparatus 300 as being individual units, the image pre-processor 350 and the stereoscopic imaging apparatus 300 can be at least partially integrated, without limitation.

Figure 9:
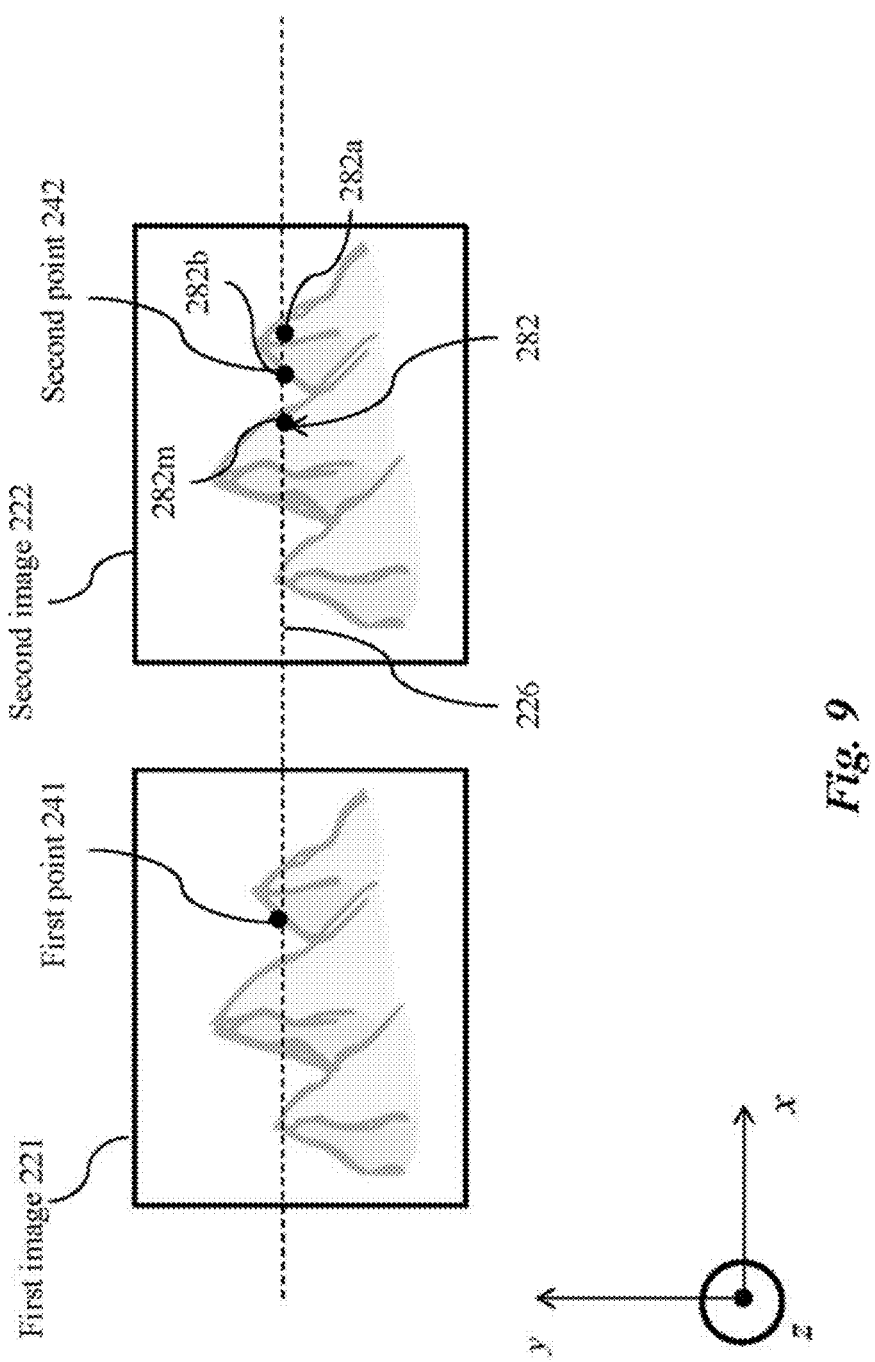
FIG. 9 is an exemplary diagram illustrating an embodiment of a method for rectifying images using the image pre-processor of FIG. 8.

Turning now to FIG. 9, the images 221, 222 after rectification are shown. Rectification advantageously aligns the images 221, 222 along the same y-axis and z-axis, such that the images 221, 22 are offset only along the x-axis. Stated somewhat differently, the second point 242 can have a same y-axis coordinate as the first point 241. Thus, the candidate second points 282 can be chosen in the second image 222 along a horizontal line 226 that passes the first point 241. Searching of the candidate second points 282 can thus be one-dimensional. Computation for the searching is advantageously simplified.

After rectification of the images 221, 222, and/or other pre-processing steps, the image pre-processor 350 (shown in FIG. 8) can transmit the rectified images 221, 222 to the stereoscopic imaging apparatus 300. Subsequently, a block configuration 310 can be selected from a plurality of block configurations. Points 241, 242 on the rectified images 221, 222 can be matched using the selected block configuration 310 using the present systems and methods.

Figure 10:
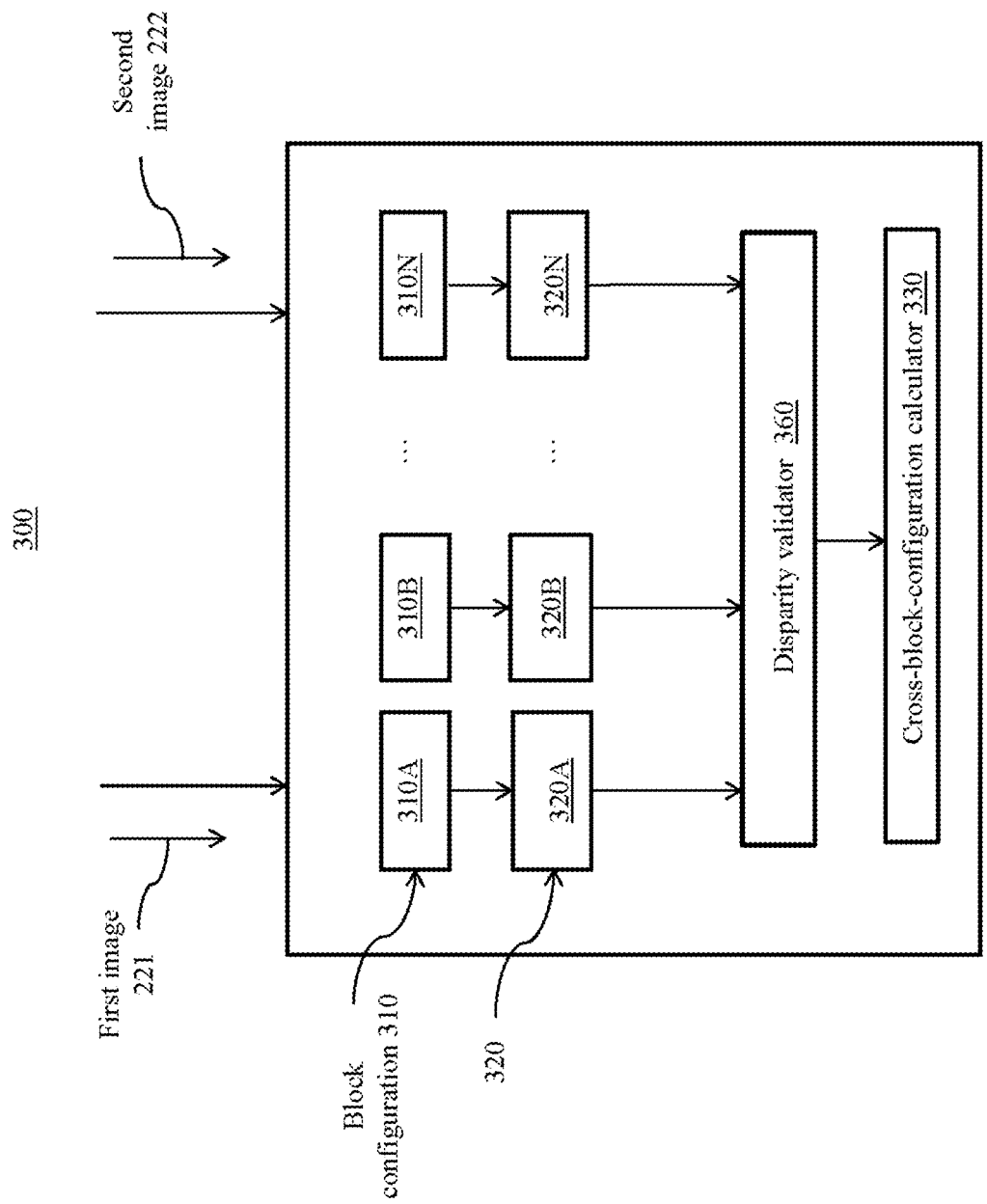
FIG. 10 is an exemplary diagram illustrating an embodiment of the system of FIG. 1, wherein a disparity validator is shown.

Turning to FIG. 10, the stereoscopic imaging apparatus 300 can include a disparity validator 360. The disparity validator 360 can perform any calculation operations used for evaluating accuracy of the disparity d using a predetermined criteria. When accuracy of the disparity d does not satisfy the predetermined criteria, the disparity validator 360 can determine that the disparity d is invalid. Although FIG. 10 shows the disparity validator 360 and the cross-block-configuration calculator 330 as being individual units, the disparity validator 360 and the cross-block-configuration calculator 330 can be at least partially integrated, without limitation.

Figure 11:
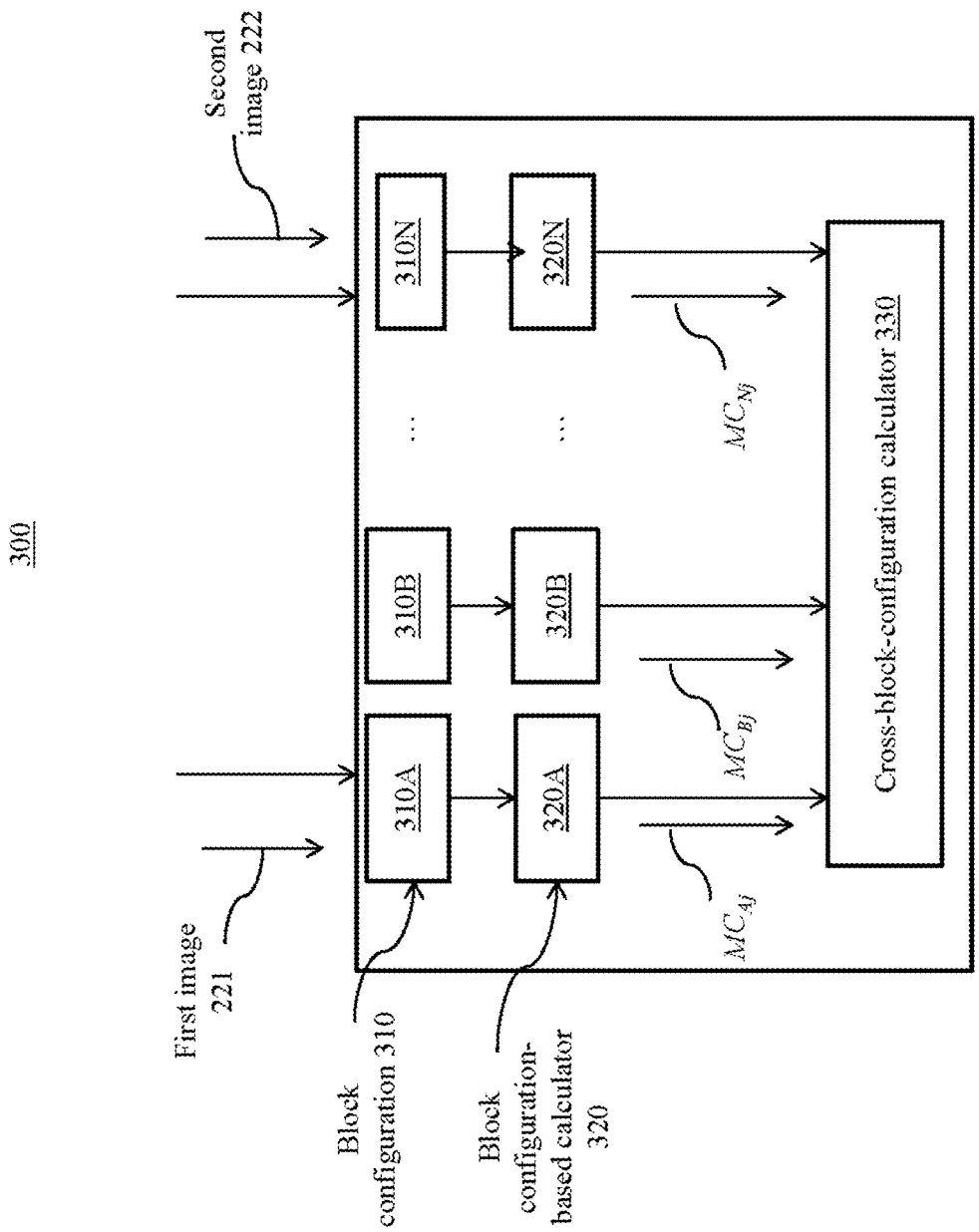
FIG. 11 is an exemplary diagram illustrating an embodiment of the system of FIG. 1, wherein block matching using matching costs are shown.

Turning to FIG. 11, exemplary embodiments are now shown to illustrate generating the matching cost c to match the points 241, 242 (shown in FIG. 2) for obtaining the disparity d. Each block configuration calculator 320 can generate an individual matching cost $MC_{ij}$ between the first point 241 and a selected candidate second point 282 shown in FIG. 7. In the individual matching cost $MC_{ij}$, i is an index over the block configurations 310 and j is an index over the candidate second points 282. Stated somewhat differently, between the first point 241 and the jth candidate second point 282, block configuration calculators 320A, 320B, . . . , 320N can calculate individual matching cost $MC_{Aj}$, $MC_{Bj}$, . . . , $MC_{Nj}$, respectively. The individual matching cost $MC_{ij}$ can be provided to the cross-block-configuration calculator 330 to be combined for identifying the second point 242 corresponding to the first point 241.

Figure 12:
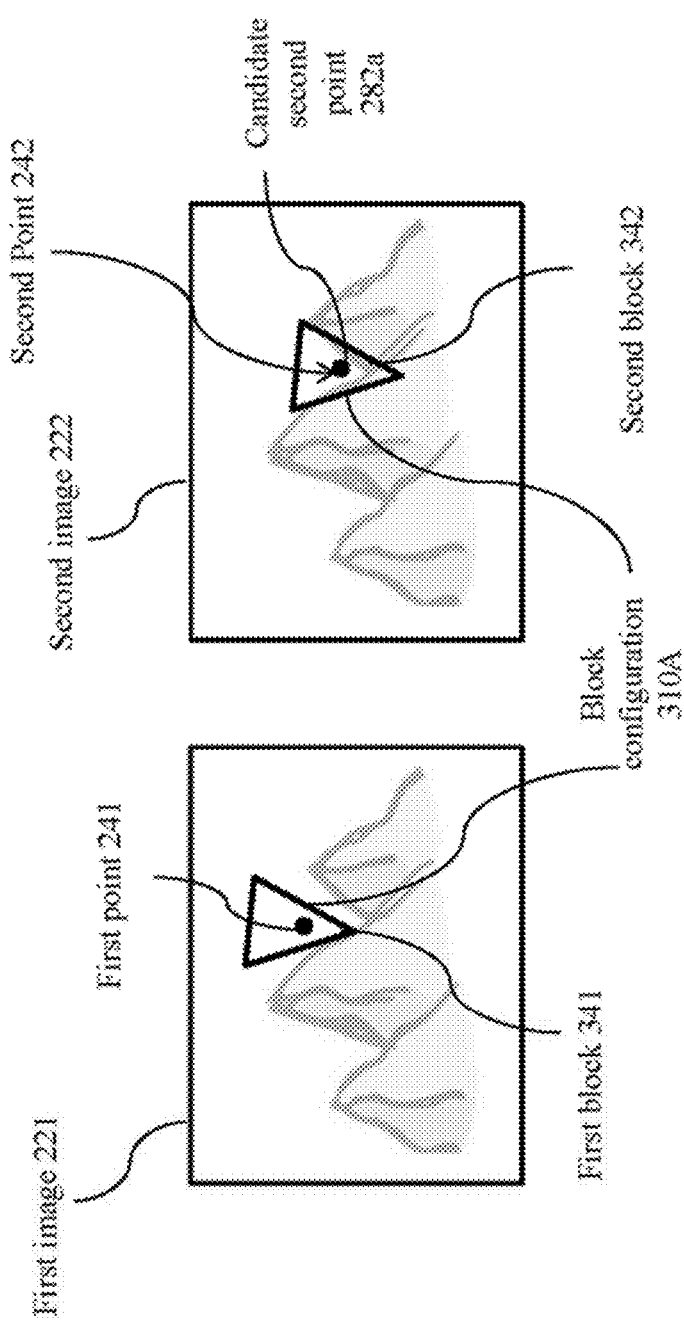
FIG. 12 is an exemplary diagram illustrating an embodiment of a method for identifying corresponding points using the system of FIG. 1.

Turning now to FIG. 12, the first block 341 and the second block 342 are shown to include the first point 241 and the candidate second point 282a. The first block 341 and the second block 342 can be based on the block configuration 310A. The block configuration 310A can have a triangular shape shown in FIG. 11 for illustrative purposes only. The individual matching cost $MC_{Aj}$ between the first point 241 and the candidate second point 282a can thus be calculated using the blocks 341, 342 based on the block configuration 310A.

Figure 13:
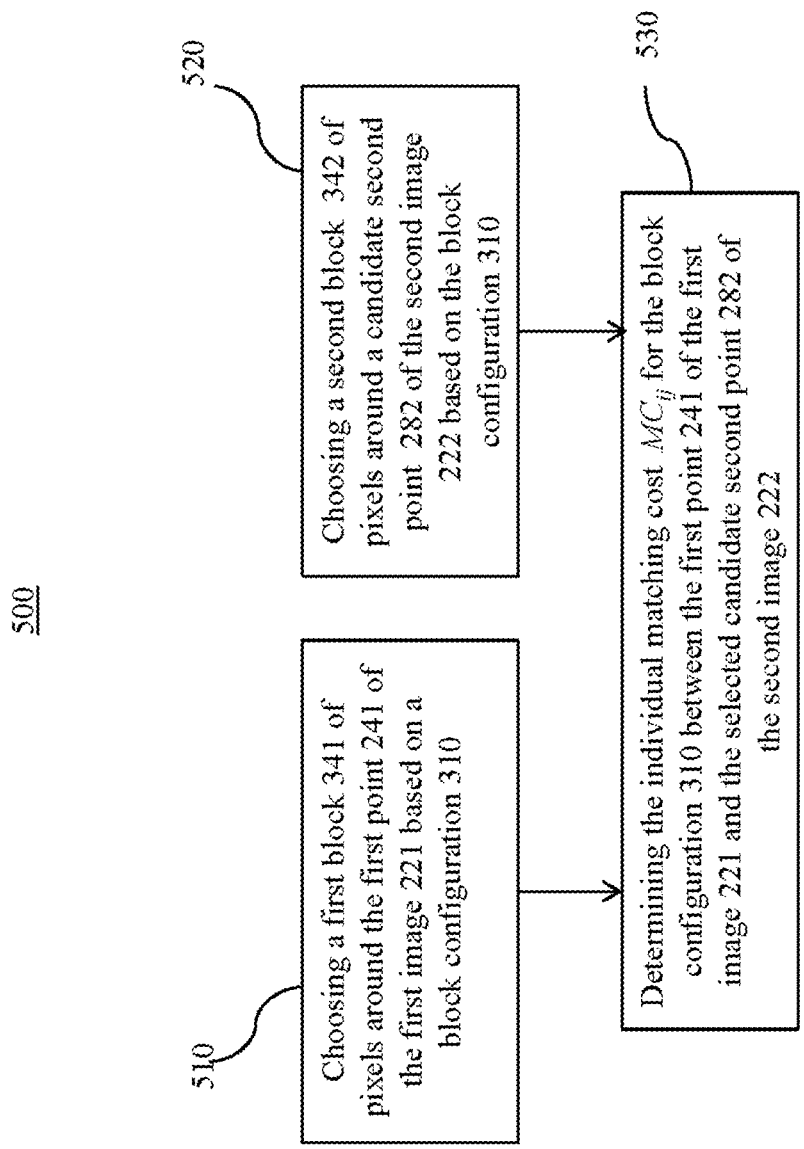
FIG. 13 is an exemplary flow chart illustrating an embodiment of a method for identifying corresponding points using the system of FIG. 1.

Turning now to FIG. 13, an exemplary method 500 for determining an individual matching cost $MC_{ij}$ for each block configuration 310 is shown. The first block 341 of pixels around the first point 241 of the first image 221 can be chosen, at 510, based on the block configuration 310. The block configuration 310 can include any one of the block configurations 310A, 310B, . . . , 310N shown in FIG. 11. A second block 342 of pixels around the candidate second point 282 of the second image 222 can be chosen based on the block configuration 310. The candidate second point 282 can include any one of the candidate second points 282a, 282b, . . . , 282m shown in FIG. 12.

The individual matching cost $MC_{ij}$ for the block configuration 310 between the first point 241 of the first image 221 and the selected candidate second point 282 of the second image 222 can be determined, at 530. The method 500 can be performed for each candidate second point 282 based on each block configuration 310.

Figure 14:
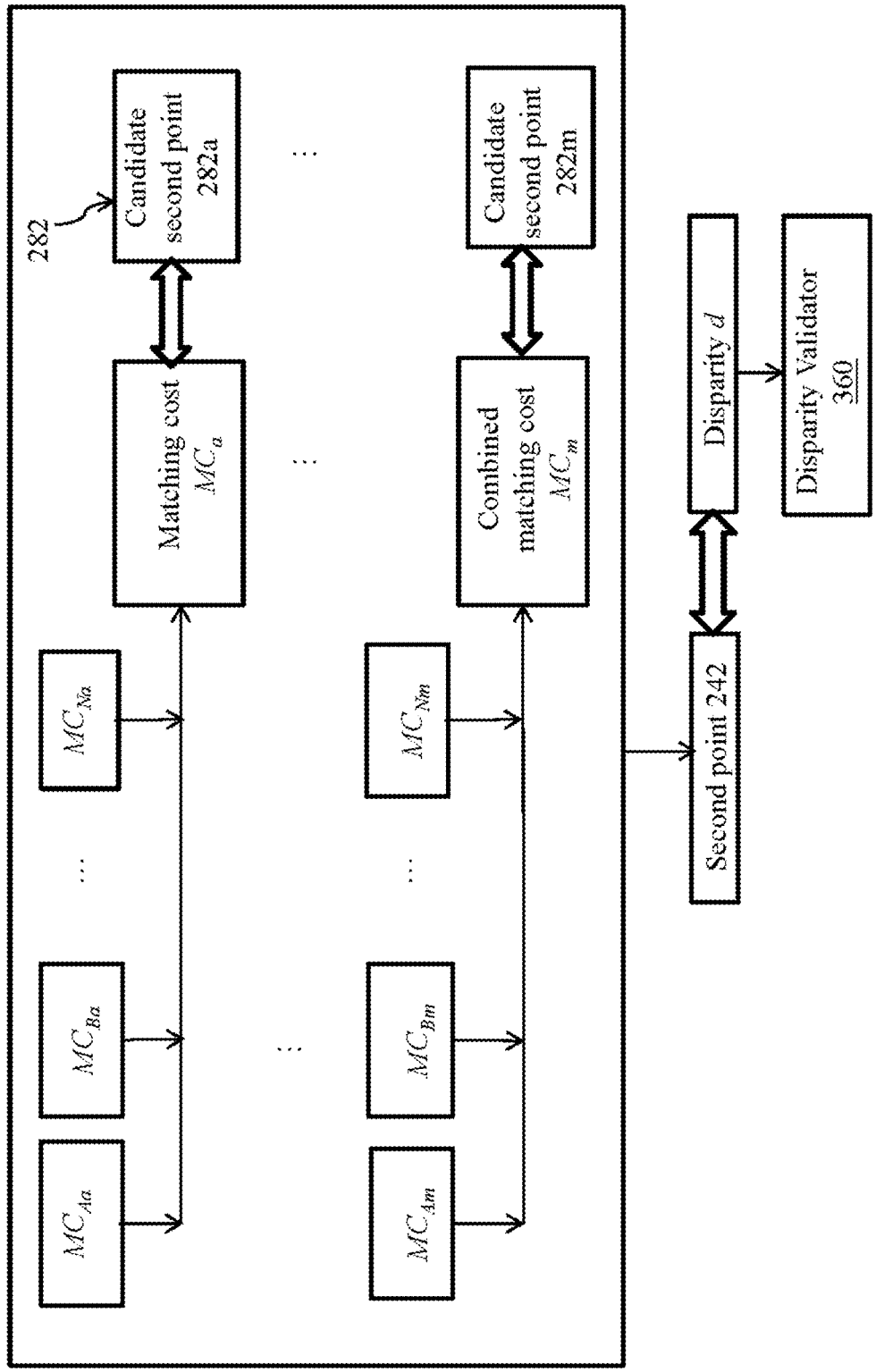
FIG. 14 is an exemplary diagram illustrating an embodiment of the system of FIG. 1, wherein matching costs are combined to identify a candidate point.

Turning to FIG. 14, the individual cost $MC_{ij}$ is shown to be combined via the cross-block-configuration calculator 330 (shown in FIG. 11) to identify the second point 242 among the candidate second points 282. As shown in FIG. 14, for the candidate second point 282a, the individual matching costs $MC_{ij}$ can include $MC_{Aa}$, $MC_{Ba}$, . . . , $MC_{Na}$. For the candidate second point 282m, the individual matching costs $MC_{ij}$ can include $MC_{Am}$, $MC_{Bm}$, . . . , $MC_{Nm}$.

For each candidate second point 282, the corresponding individual matching cost $MC_{ij}$ can be combined to generate the matching cost $MC_j$. As shown in FIG. 14, for the candidate second point 282a, the individual matching costs $MC_{Aa}$, $MC_{Ba}$, . . . , $MC_{Na}$ can be combined to generate matching cost $MC_a$. For the candidate second point 282m, the sub-individual matching costs $MC_{Am}$, $MC_{Bm}$, . . . , $MC_{Nm}$ can be combined to generate matching cost $MC_m$.

The matching cost $MC_j$ of the corresponding second point 282 can be generated in any suitable manner. For example, the matching cost $MC_j$ can be a function $f$ of the individual matching costs $MC_{ij}$ of the corresponding candidate second point 282:

$$MC_j = f(MC_{Aj}, MC_{Bj}, \ldots, MC_{Nj}).\qquad\text{Equation (5)}$$

In one embodiment, the matching cost $MC_j$ can be determined by selecting one of the individual matching costs $MC_{Aj}$, $MC_{Bj}$, . . . , $MC_{Nj}$. For example, the matching cost $MC_j$ can be determined by selecting the greatest or best one of the individual matching costs $MC_{Aj}$, $MC_{Bj}$, . . . , $MC_{Nj}$, that is, by selecting the individual matching cost that indicates the best matching.

In another embodiment, the $MC_j$ can be determined by weighing the individual matching costs $MC_{Aj}$, $MC_{Bj}$, . . . , $MC_{Nj}$, as expressed as follows for illustrative purposes:

$$MC_j = \Sigma_{i=A}^{N} w_i MC_{ij}\qquad\text{Equation (6)}$$

where $w_i$ is a weight of the ith block configuration 310. The $w_i$ can be pre-determined based on accuracy of the ith block configuration 310 for all images or for the specific type of content of images 221, 222 shown in FIG. 12.

The matching costs $MC_j$ of the candidate second points 282 can be compared to identify a candidate second point 282. In one example, the second point 242 having the greatest matching cost $MC_j$ can be selected as the matching second point 242. In another example, the matching cost $MC_j$ of each candidate second point 282 can be compared with a threshold matching cost. When the matching cost $MC_j$ indicates a better match than the threshold matching cost, the corresponding candidate second point 282 can be selected as the matching second point 242.

As shown in FIG. 14, by using a the plurality of block configurations 310A, 310B, . . . , 310N, a plurality of individual matching costs $MC_{ij}$ can be obtained for each of the candidate second point 282. Problems of mismatch and/or poor match for a single block configuration 310 can thereby be prevented. The identified second point 242 can have the best matching cost that is provided by the block configuration 310 that is optimally adapted to the scene of the images 221, 222.

Figure 15:
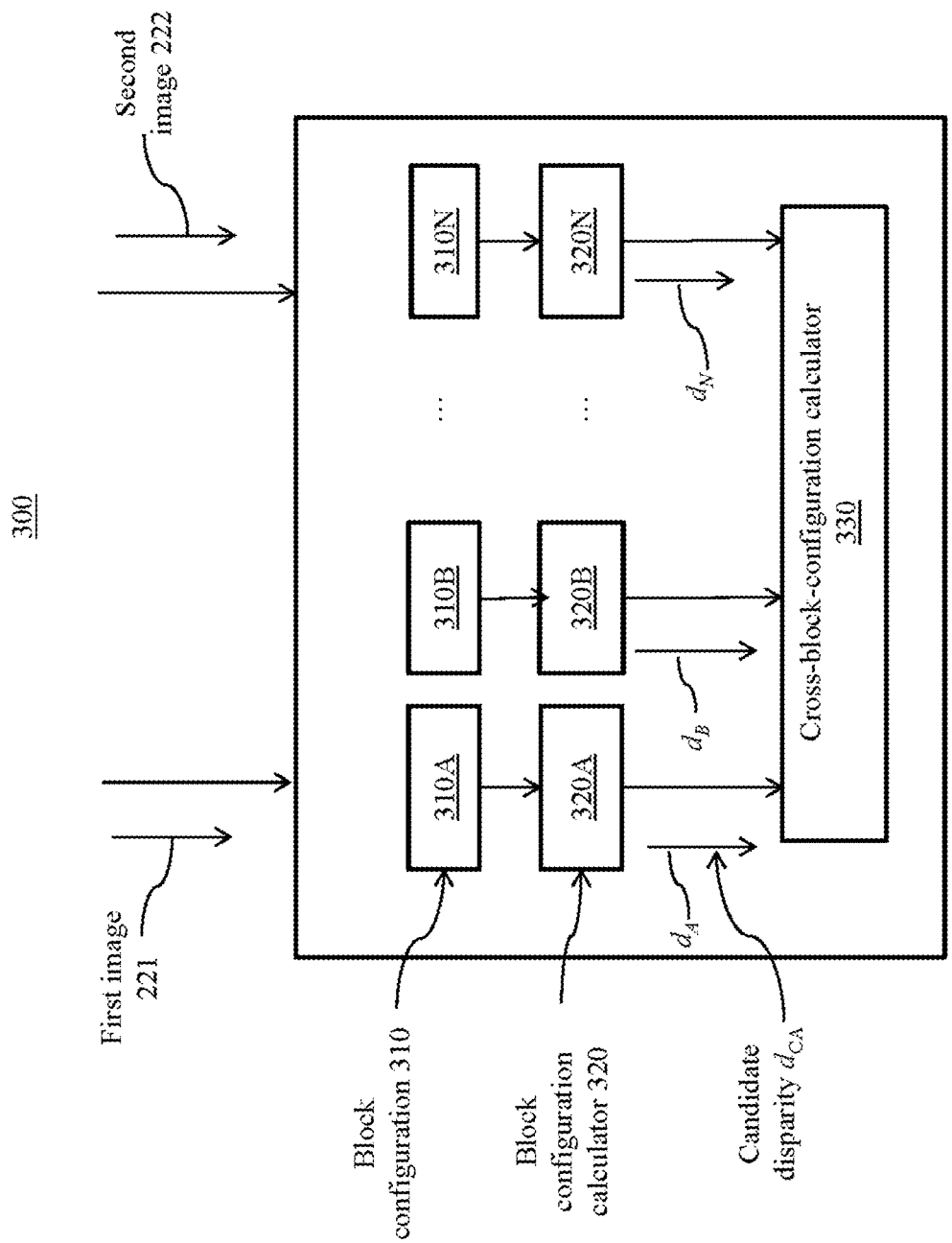
FIG. 15 is an exemplary diagram illustrating an embodiment of the system of FIG. 1, wherein candidate disparities are found for determining a binocular disparity.

Turning to FIG. 15, each block configuration calculator 320 can generate a candidate disparity $d_{CA}$. Each candidate disparity $d_{CA}$ can be obtained using the second point 242 (shown in FIG. 2) that is identified based on the block configuration 310. Stated somewhat differently, based on a selected block configuration 310, a second point 242 can be identified among the candidate second points 282. The candidate disparity $d_{CA}$ can thus be obtained based on the second point 242. For example, the candidate disparities $d_A$, $d_B$, . . . , $d_N$ shown in FIG. 15 can be obtained based on the second points 242 respectively identified using the block configuration 310A, 310B, . . . , 310N.

Using a selected block configuration 310 with index of i, the block configuration calculator 320 can identify the corresponding second point 242 in any suitable manner. For example, individual matching cost $MC_{ij}$ can be calculated for each candidate second point 282 based on the ith block configuration 310. The candidate second point 282 associated with the best individual matching cost $MC_{ij}$ can be selected as the second point 242 for the ith block configuration 310.

Figure 16:
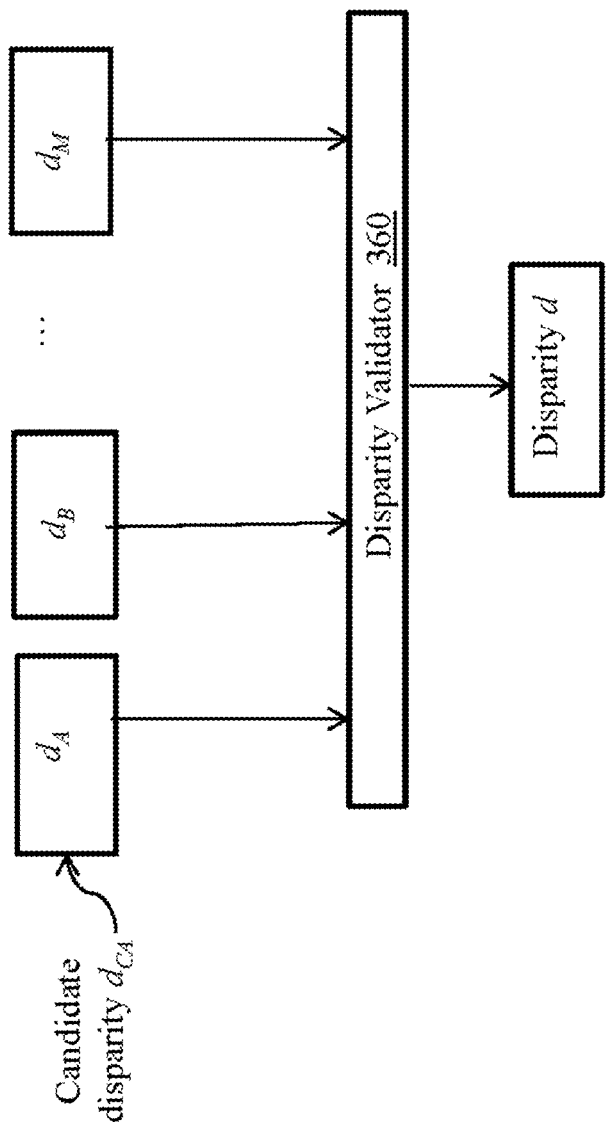
FIG. 16 is an exemplary diagram illustrating another embodiment of the system of FIG. 1, wherein candidate disparities are validated using a disparity validator.

The candidate disparities $d_{CA}$ are inputted to the cross-block-configuration calculator 330 to be combined for identifying the disparity d. Turning to FIG. 16, an illustrative example of combining the candidate disparities $d_{CA}$ is shown. The candidate disparities $d_{CA}$ can be validated in any manner. For example, the candidate disparities $d_{CA}$ can be validated via the disparity validator 360. Validation of the candidate disparities $d_{CA}$ of a selected block configuration 310 shown in FIG. 15 can include, for example, comparing the threshold matching cost with the individual matching cost $MC_{ij}$ of the second point 242 identified using the selected block configuration 310. If the individual matching cost $MC_{ij}$ of the identified second point 242 is worse than the threshold matching cost, the candidate disparities $d_{CA}$ associated with such a second point 242 is not valid.

In an illustrative and non-limiting example, a candidate disparity $d_{CA}$ associated with the block configuration 310 having the greatest size can be validated first. When the candidate disparity $d_{CA}$ is valid, the $d_{CA}$ can be identified as the disparity d. A block configuration 310 having a large size can provide great amount of information for matching and thus allow block matching at high accuracy. Thus, starting validation from the block configuration 310 having the greatest size can advantageously identify the disparity d accurately at early stage of the validation.

When such a candidate disparity $d_{CA}$ is invalid, a candidate disparity $d_{CA}$ associated with a different block configuration 310 can be validated. For example, the candidate disparity $d_{CA}$ of the block configuration 310 having the greatest size can be invalid due to poor matching resulting from significant depth variation of imaging. In that case, the block configuration 310 having the same size but a different shape can be validated. Additionally and/or alternatively, the block configuration 310 having a smaller size with a different and/or same shape can be validated. Advantageously, by using the plurality of block configurations 310, a probability of successful block matching can be improved and failed block matching can be prevented.

The validation can be implemented until at least one candidate disparity $d_{CA}$ is identified. Additionally and/or alternatively, the validation can be implemented on all candidate disparities $d_{CA}$. In some cases, one or more candidate disparities $d_{CA}$ can be determined as valid, and each of the valid candidate disparities $d_{CA}$ can be identified as the disparity d. The valid candidate disparities $d_{CA}$ can be combined to form the disparity d, for example, via a filtering technique such as mean filtering and/or median filtering.

Figure 17:
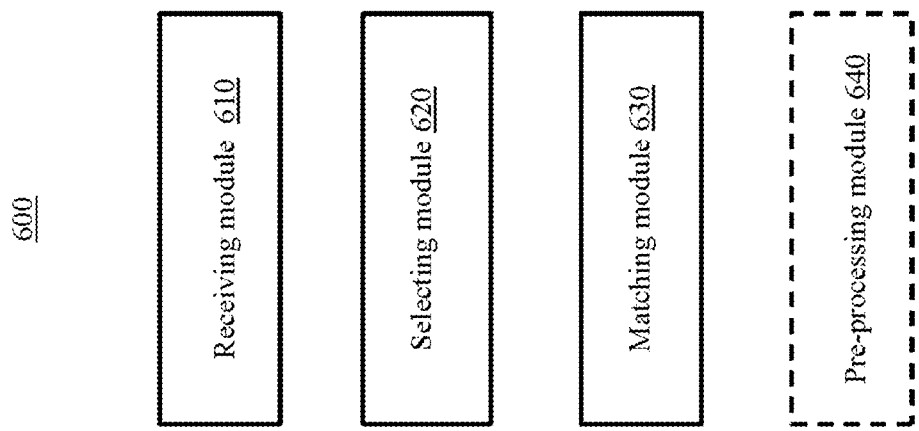
FIG. 17 is an exemplary top level block diagram illustrating modules of a processing system for block matching.

Turning now to FIG. 17, an exemplary processing system 600 is shown as including one or more modules to perform any of the disclosed methods. The processing system 600 is shown as including a receiving module 610, a selecting module 620, and a matching module 630. In some embodiments, the receiving module 610 can be configured to obtain a first image 221 and a second image 222 (both shown in FIG. 1). The receiving module 610 can receive the images 221, 222 respectively obtained by a first imaging device 201 and a second imaging device 202 (both shown in FIG. 1). The selecting module 620 can be configured to select a plurality of block configurations 310. The matching module 630 can be configured to match the first point 241 on the first image 221 with the corresponding second point 242 on the second image 222 using the block configurations 310, as shown in FIG. 2.

In some embodiments, the block configurations 310 can have different sizes. In some embodiments, at least one block configuration 310 can have a size of 7 pixels by 7 pixels, 9 pixels by 9 pixels, 13 pixels by 13 pixels, or 25 pixels by 25 pixels. In some embodiments, the block configurations 310 can have different shapes. In some embodiments, at least one of the block configurations 310 can have a non-rectangular shape. In some embodiments, the block configurations 310 can include a block configuration 310 with a circular shape, a block configuration with a triangular shape, a block configuration with a trapezoidal shape, or a combination thereof.

In some embodiments, the selecting module 620 can be configured to select one or more pre-determined block configurations 310. In some embodiments, the selecting module 620 can be configured to dynamically select the block configurations 310. In some embodiments, the selecting module 620 can be configured to randomly select the block configurations 310.

In some embodiments, the matching module 630 can be configured to determine a matching cost c between the first point 241 on the first image 221 and each of a plurality of candidate second points 282 (shown in FIG. 7) of the second image 222 to identify the corresponding second point 242. In some embodiments, the matching module 630 can be configured to determine a matching cost between the first point 241 on the first image 221 and each of a plurality of candidate second points 282 on a line of the second image 222 to identify the corresponding second point 242. In some embodiments, the matching module 630 can be configured to determine the matching cost based on individual matching costs c for each of the block configurations 310. In some embodiments, the matching module 630 can be configured to determine the matching cost by selecting one of the individual matching costs c. In some embodiments, the matching module 630 can be configured to determine the matching cost by weighing the individual matching costs c. In some embodiments, the matching module 630 can be configured to determine the matching cost using a predetermined weight for each block configuration 310. In some embodiments, the matching module 630 can be configured to determine the individual matching costs for each block configuration 310 of the block configurations 310 by choosing a first block 341 of pixels around the first point 241 of the first image 221 based on the block configuration 310, choosing a second block 342 of pixels around a selected candidate second point 282 of the second image 222 based on the block configuration 310, and determining the individual matching cost for the block configuration 310 between the first point 241 of the first image 221 and the selected candidate second point 282 of the second image 222.

In some embodiments, the matching module 630 can be configured to determine an object distance D based on a disparity d between the first point 241 of the first image 221 and the corresponding second point 242 of the second image 222.

In some embodiments, the matching module 630 can be configured to determine individual matching costs between the first point on the first image and each of a plurality of candidate second points on the second image based on each of the block configurations to select candidate second points respectively corresponding to the block configurations.

In some embodiments, the matching module 630 can be configured to obtain candidate disparities $d_{CA}$ between the first point 241 and the selected candidate second points 282, respectively, and determine the disparity d based on the candidate disparities $d_{CA}$. In some embodiments, the matching module 630 is configured to determine an object distance D based on the disparity d.

In some embodiments, the matching module 630 can be configured to match a first pixel on the first image 221 with a corresponding second pixel on the second image 222 using the block configurations 310. In some embodiments, the matching module 630 is configured to match a first feature on the first image 221 with a corresponding second feature on the second image 222 using the block configurations 310.

As shown in FIG. 17, the processing system 600 can optionally include a pre-processing module 640 for pre-processing the first and second images 221, 222 prior to the matching. In some embodiments, the pre-processing module 640 is configured to rectify the second image 222 relative to the first image 221.

Figure 18:
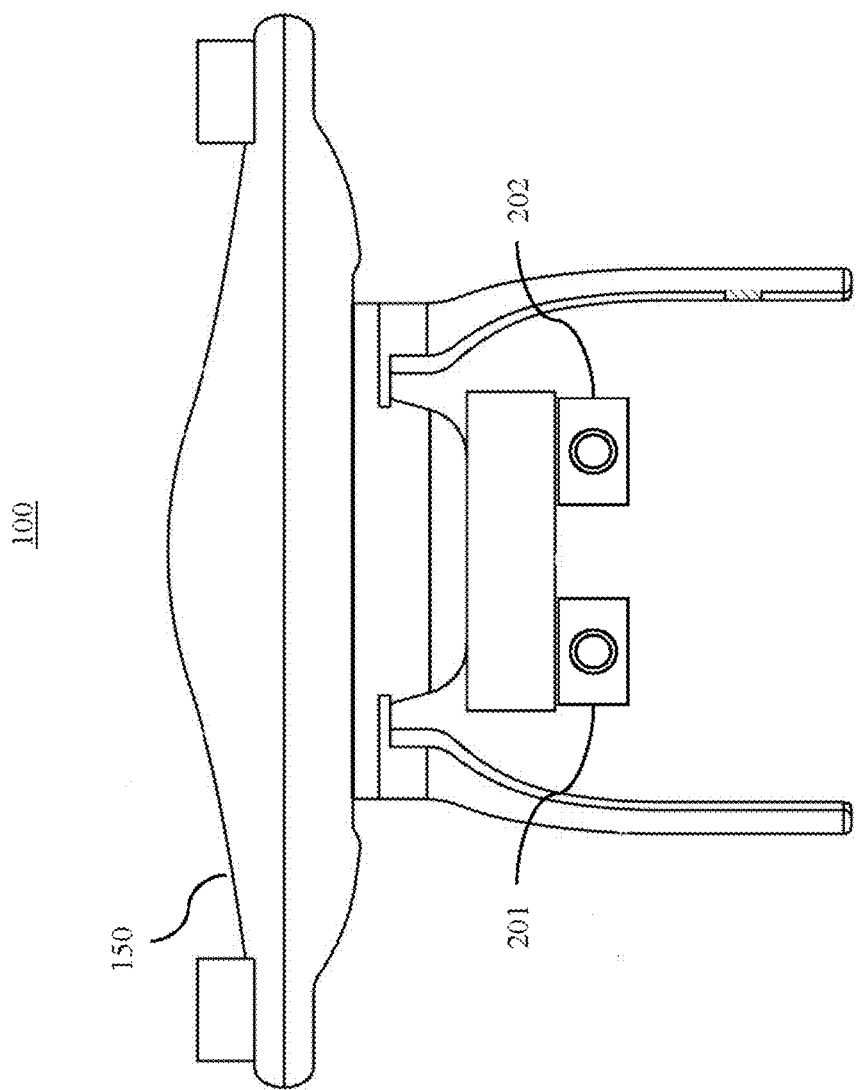
FIG. 18 is exemplary diagram illustrating an embodiment of the system of FIG. 1, wherein the system is an unmanned aerial vehicle (UAV).

Turning now to FIG. 18, an exemplary stereoscopic imaging system 100 is shown as being a mobile platform that is an unmanned aerial vehicle (UAV) 150. Stated somewhat differently, the stereoscopic imaging system 100 can be mounted on the mobile platform, such as the UAV 150. UAVs 150, colloquially referred to as "drones," are aircraft without a human pilot onboard the vehicle whose flight is controlled autonomously or by a remote pilot (or sometimes both). UAVs are now finding increased usage in civilian applications that require various forms of aerial data-gathering. Various types of UAVs 150 are suitable for use as stereoscopic imaging systems 100. One suitable type of UAV 150, for example, is an aerial rotorcraft that is propelled by multiple rotors. One suitable type of rotorcraft has four rotors and is known as a quadcopter, quadrotor helicopter, or quad rotor. Exemplary quadcopters suitable for the present systems and methods for imaging (for example, stereoscopic imaging) include numerous models currently available commercially. UAVs 150 suitable for the present systems and methods further include, but are not limited to, other rotor designs such as single rotor, dual rotor, trirotor, hexarotor, and octorotor designs. Fixed wing UAVs 150 and hybrid rotorcraft-fixed wing UAVs 150 can also be used. Imaging devices 201, 202 can be mounted to the UAV 150 in any suitable manner (for example, on an underside of the UAV 150). Other components of the stereoscopic imaging system 100 can be included in a fuselage of the UAV 150, as appropriate, for protection against wear and tear.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of block matching for providing depth information of an object, the method comprising:

setting a plurality of block configurations each corresponding to one block configuration calculator and each including one or more configuration parameters for defining blocks on images, the one or more configuration parameters including block sizes and block shapes;

selecting a first block configuration from the plurality of block configurations and selecting a second block configuration from the plurality of block configurations, a block size of the selected first block configuration being determined at least by a texture of the object on the blocks of the images, the texture of the object being identified by an image feature recognition, and the selected second block configuration having at least one configuration parameter different from the selected first block configuration;

choosing a first block of pixels around a first point of a first image based on the selected first block configuration and the selected second block configuration;

selecting a first candidate second point from a plurality of candidate second points of a second image and locating a second block of pixels around the first candidate second point based on the selected first block configuration and the selected second block configuration;

calculating, by a corresponding block configuration calculator of the selected first block configuration, a first matching cost for the selected first block configuration between the first point of the first image and the first candidate second point of the second image, and calculating, by a corresponding block configuration calculator of the selected second block configuration, a second matching cost for the selected second block configuration between the first point of the first image and the first candidate second point of the second image;

selecting a second candidate second point from the plurality of candidate second points of the second image, and calculating a third matching cost for the selected first block configuration and a fourth matching cost for the selected second block configuration, respectively, based on the second candidate second point; and obtaining a cross-block comparison based on the first matching cost, the second matching cost, the third matching cost, and the fourth matching cost to match the first point in the first image with a corresponding second point in the second image, thereby improving an accuracy and reliability of the depth information to enhance a control of a mobile platform with respect to the object.

2. The method of claim 1, wherein matching the first point with the corresponding second point comprises:

determining matching costs between the first point in the first image and the plurality of candidate second points in the second image; and identifying the corresponding second point from the plurality of candidate second points based on the matching costs.

3. The method of claim 2, where determining the matching costs between the first point and the plurality of candidate second points comprises determining matching costs between the first point in the first image and a plurality of candidate second points on a line of the second image.

4. The method of claim 2, wherein determining the matching costs between the first point and the plurality of candidate second points comprises, for one candidate second point of the plurality of candidate second points:

determining individual matching costs between the first point and the candidate second point, each of the individual matching costs being determined based on one block configuration of the block configurations; and determining the matching cost between the first point and the candidate second point based on the individual matching costs.

5. The method of claim 1, further comprising:
determining an object distance based on a disparity between the first point of the first image and the corresponding second point of the second image.

6. The method of claim 1, wherein matching the first point with the corresponding second point comprises determining individual matching costs between the first point and each of the plurality of candidate second points in the second image based on each of the block configurations to select multiple candidate second points respectively corresponding to the block configurations.

7. The method of claim 6, further comprising:
obtaining candidate disparities between the first point and the selected multiple candidate second points, respectively; and
determining a disparity between the first point and the corresponding second point based on the candidate disparities.

8. A stereoscopic imaging system for providing depth information of an object, the system comprising:
a first imaging device configured to obtain a first image;
a second imaging device configured to obtain a second image; and
one or more processors configured to:
set a plurality of block configurations each corresponding to one block configuration calculator and each including one or more configuration parameters for defining blocks on images, the one or more configuration parameters including block sizes and block shapes;
select a first block configuration from the plurality of block configurations and select a second block configuration from the plurality of block configurations, a block size of the selected first block configuration being determined at least by a texture of the object on the blocks of the images, the texture of the object being identified by an image feature recognition, and the selected second block configuration having at least one configuration parameter different from the selected first block configuration;
choose a first block of pixels around a first point of the first image based on the selected first block configuration and the selected second block configuration;
select a first candidate second point from a plurality of candidate second points of the second image and locate a second block of pixels around the first candidate second point based on the selected first block configuration and the selected second block configuration;
calculate, by a corresponding block configuration calculator of the selected first block configuration, a first matching cost for the selected first block configuration between the first point of the first image and the first candidate second point of the second image, and calculate, by a corresponding block configuration calculator of the selected second block configuration, a second matching cost for the selected second block configuration between the first point of the first image and the first candidate second point of the second image;
select a second candidate second point from the plurality of candidate second points of the second image, and calculate a third matching cost for the selected first block configuration and a fourth matching cost for the selected second block configuration, respectively, based on the second candidate second point; and
obtain a cross-block comparison based on the first matching cost, the second matching cost, the third matching cost, and the fourth matching cost to match the first point in the first image with a corresponding second point in the second image, thereby improving an accuracy and reliability of the depth information to enhance a control of a mobile platform with respect to the object.

9. The stereoscopic imaging system of claim 8, wherein the one or more processors are further configured to:
determine matching costs between the first point in the first image and the plurality of candidate second points in the second image; and
identify the corresponding second point from the plurality of candidate second points based on the matching costs.

10. The stereoscopic imaging system of claim 9, where the one or more processors are further configured to:
determine matching costs between the first point in the first image and a plurality of candidate second points on a line of the second image; and
identify the corresponding second point from the plurality of candidate second points on the line based on the matching costs.

11. The stereoscopic imaging system of claim 9, wherein the one or more processors are further configured to, for one candidate second point of the plurality of candidate second points:
determine individual matching costs between the first point and the candidate second point, each of the individual matching costs being determined based on one block configuration of the block configurations; and
determine the matching cost between the first point and the candidate second point based on the individual matching costs.

12. The stereoscopic imaging system of claim 8, wherein the one or more processors are further configured to determine an object distance based on a disparity between the first point of the first image and the corresponding second point of the second image.

13. The stereoscopic imaging system of claim 8, wherein the one or more processors are further configured to determine individual matching costs between the first point and each of the plurality of candidate second points in the second image based on each of the block configurations to select multiple candidate second points respectively corresponding to the block configurations.

14. The stereoscopic imaging system of claim 13, wherein the one or more processors are further configured to:
obtain candidate disparities between the first point and the selected multiple candidate second points, respectively; and
determine a disparity between the first point and the corresponding second point based on the candidate disparities.

15. The stereoscopic imaging system of claim 8, wherein the one or more processors are further configured to match a first feature in the first image with a corresponding second feature in the second image using at least one of the selected first block configuration or the selected second block configuration.

16. The stereoscopic imaging system of claim 8, wherein the one or more processors are further configured to preprocess the first image and the second image prior to matching the first point with the corresponding second point.

17. The stereoscopic imaging system of claim 16, wherein the one or more processors are further configured to rectify the second image relative to the first image.

\* \* \* \* \*